United States Patent [19]

Piller

[11] Patent Number: 4,611,401

[45] Date of Patent: Sep. 16, 1986

[54] CHAIN SAW GUIDE BAR EXTENSION

[76] Inventor: Michael N. Piller, 3270 I St., Washougal, Wash. 98671

[21] Appl. No.: 671,245

[22] Filed: Nov. 14, 1984

[51] Int. Cl.[4] ................ B23D 57/02

[52] U.S. Cl. ................ 30/387; 30/381; 30/383; 198/860.2

[58] Field of Search ................ 30/383, 381, 387, 386, 30/384, 382, 385; 198/860.2

[56] References Cited

U.S. PATENT DOCUMENTS

| | | | |
|---|---|---|---|
| 2,948,309 | 8/1960 | Hoff et al. | 30/387 |
| 3,191,646 | 6/1965 | Merz | 30/387 |
| 3,955,279 | 5/1976 | Pierson | 30/384 |
| 4,381,606 | 5/1983 | Ekrud et al. | 30/387 |
| 4,489,493 | 12/1984 | Tsumura | 30/387 |
| 4,534,401 | 8/1985 | Silverthorn et al. | 198/860.2 X |

FOREIGN PATENT DOCUMENTS

| | | | |
|---|---|---|---|
| 850803 | 7/1949 | Fed. Rep. of Germany | 30/387 |

*Primary Examiner*—E. R. Kazenske
*Assistant Examiner*—W. Fridie
*Attorney, Agent, or Firm*—Brady, O'Boyle & Gates

[57] ABSTRACT

A guide bar extension member coupled to a guide bar of a chain saw for selectively lengthening or shortening the cutting bar for cutting different size pieces of timber, for example. In its preferred form, the guide bar comprises a sectional guide bar assembly which is separable at the high point of its curved periphery into rear and forward guide bar portions with an extension element of a predetermined length inserted therebetween.

11 Claims, 10 Drawing Figures

CHAIN SAW GUIDE BAR EXTENSION

BACKGROUND OF THE INVENTION

This invention relates generally to chain saws and more particularly to a guide bar for a chain saw whose length is variable depending upon a particular job requirement.

DESCRIPTION OF THE PRIOR ART

A guide bar for a chain saw comprises an elongated outwardly projecting member having a curved periphery for supporting a saw chain that is driven by a sprocket coupled to a drive unit, such as a gasoline engine. As is well known, the guide bar is subjected to a great deal of wear and tear due to the friction of the drive chain, particularly at the tip or nose portion, and therefore requires frequent replacement. Since the nose portion of the bar has been found to endure the most wear, the prior art has recognized the need for and teaches a guide bar structure having a replaceable nose portion. It is also a common practice in conventional chain saws to provide for a small positional adjustment of the guide bar at the drive unit end of the bar for taking up any slack in the saw chain. Such apparatus, however, does not permit the lengthening or shortening of the effective working length of the guide bar over a relatively wide range for accommodating different size work pieces without a complete replacement of the bar.

It is an object of the present invention, therefore, to provide an improvement in the construction of the guide bar for a chain saw.

Another object of the invention is to provide for a guide bar whose effective working length is variable.

Still a further object of the invention is to provide for a single guide bar whose length is selectively variable to meet a changing work requirement.

And yet another object of the invention is to provide for an improvement in guide bars whereby its length is changed on demand to accommodate the size of the particular piece being sawed.

SUMMARY

Briefly, the foregoing and other objects are provided by the inclusion of interchangeable guide bar extension means coupled to the guide bar of a chain saw for varying the effective working length of the bar for cutting different sized material depending upon the needs of the user. In its preferred form, the guide bar includes a separation of the bar at the high point of the bar contour, i.e. the region of greatest height, into rear and forward guide bar portions with a bar extension member ranging anywhere from between two inches and twenty inches inserted therebetween.

BRIEF DESCRIPTION OF THE DRAWINGS

While the present invention is defined in the claims annexed to and forming a part of this specification, a better understanding can be had by reference to the following description when taken in conjunction with the accompanying drawings in which:

DESCRIPTION OF THE PREFERRED EMBODIMENTS

Figures 1, 2, 3, 4:
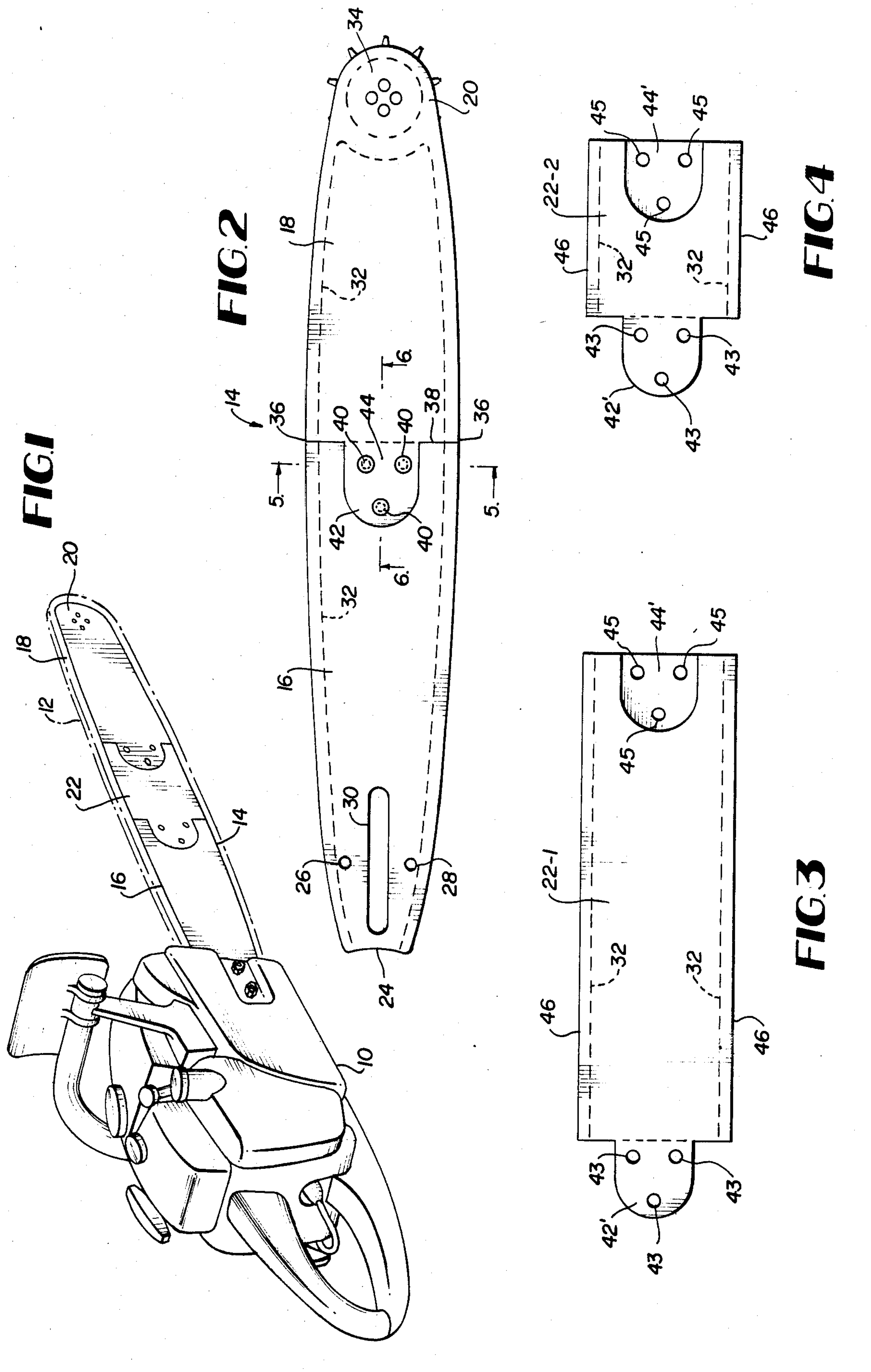
FIG. 1 is a perspective view of a chain saw incorporating the preferred embodiment of the invention.
FIG. 2 is a top planar view of a chain saw guide bar having front and rear portions which are separable to receive a guide bar extension member therebetween in accordance with the subject invention.
FIG. 3 is a top planar view of a first length guide bar extension member which can be inserted between the front and rear portions of the guide bar shown in FIG. 2.
FIG. 4 is a second and relatively shorter guide bar extension member which can be inserted between the front and rear portions of the guide bar shown in FIG. 2.

Referring now to the drawings wherein like numerals refer to correspondingly like components, reference is first made to FIG. 1. There reference numeral 10 generally denotes a motorized drive unit of a chain saw which is operable to drive a saw chain 12 around the periphery of an elongated guide bar assembly 14 which is the subject matter of this invention. Further as shown in FIG. 1, the guide bar assembly 14 is comprised of a rear guide bar portion 16 which is secured to the drive unit 10 and a forward guide bar portion 18 which includes a sprocketed tip or nose portion 20 to facilitate the travel of the cutting chain 12 as it reverses direction.

The embodiment of FIG. 1 furthermore discloses means for lengthening or shortening the working length of the guide bar assembly to accommodate the change in size of timber encountered, for example, in a logging operation and which can vary drastically from job to job. The means contemplated in the preferred embodiment of the invention as shown in FIG. 1 comprises the inclusion of a lengthening or shortening guide bar member 22 located intermediate the rear and forward guide bar portions 16 and 18 and having matching height, i.e. top to bottom, dimensions at the point of juncture therewith to provide a coextensively continuous track for the saw chain 12.

The structural details of the arrangement shown in FIG. 1 can be readily understood by reference to FIGS. 2 through 6. FIG. 2, for example, discloses rear and forward guide bar portions 16 and 18 of a sectional guide bar assembly 14 directly joined together but configured as to be connectable to either of the inserts shown in FIGS. 3 and 4. The rear guide bar portion 16 is further shown including a concave end surface 24 for being fitted to the drive unit 10, a pair of drive unit mounting holes 26 and 28, as well as a slot 30 which provides a means for adjusting the tension of the saw chain in accordance with conventional practice.

Figure 5:
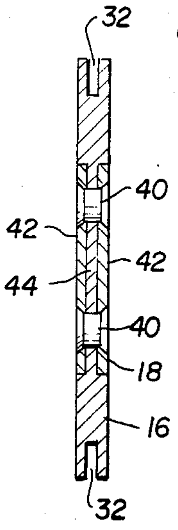
FIG. 5 is a sectional view of FIG. 2 taken along the line 5—5 thereof.
Figure 6:
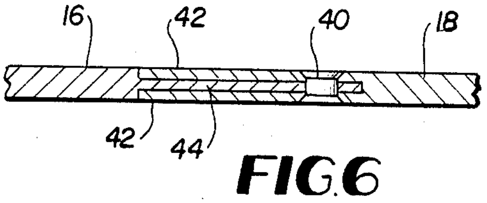
FIG. 6 is a sectional view of FIG. 2 taken along the line 6—6 thereof.

Both the rear and forward guide bar portions 16 and 18 include a track 32 for accommodating the passage of the saw chain 12 (FIG. 1) which further engages a freely rotatable sprocket 34 located in the nose portion 20. While not shown in FIG. 1, the sprocket tip 20 may be configured to include a detachable nose portion which is readily changeable in a manner well known to those skilled in the art. The rear and front guide bar portions 16 and 18, moreover, are joined at the high point of the outer edge contour of the guide bar assembly 14 as indicated by reference numeral 36 and which is the location of its greatest width. The point 36, moreover, is normally located substantially midway between the effective working length of the guide bar assembly 14, i.e. the distance from the front of the drive unit 10 to the outer end of the forward guide bar portion 18. The two bar portions 16 and 18 are adapted to join together as shown in FIG. 2 along the line 38 which spans the height of the guide bar assembly 14 at the location of the high point 36. Interconnection is made by means of a set of rivets 40 which pass through holes formed in a bifurcated rounded end segment 42 of the forward bar portion 18 and a similarly shaped unitary end segment 44 of reduced thickness formed in the rear bar portion 16. The end segments 42 and 44 fit together as shown in FIGS. 5 and 6.

The rivets 40 as shown in FIG. 2 are adapted to be readily removed by the operator, as required, so that the two bar portions 16 and 18 can be separated for the insertion of an extension member 22 such as shown in FIG. 1. The present invention contemplates the insertion of guide bar extension members 22 of different lengths depending upon the task at hand. Accordingly, extension members 22 varying between 2 inches and 20 inches, for example, can be inserted and which would be considerably less expensive to purchase than a completely new guide bar to perform the specific job.

Accordingly, FIGS. 3 and 4 are intended to illustrate a pair of extension members 22-1 and 22-2 of two different lengths with the extension member shown in FIG. 3 being considerably longer than that shown in FIG. 4. Each of the members, however, include a bifurcated end segment 42' at one end including rivet holes 43 so as to mate with the recessed end segment 44 of the rear guide bar portion 16 and a similarly shaped recessed end segment 44' at the other end including the rivet holes 45 and which are adapted to mate with the bifurcated end portion 42 of the forward guide bar portion 18. Two sets of rivets 40, not shown, are required to make the required interconnection resulting in a configuration shown in FIG. 1.

Thus by the use of interchangeable different length guide bar inserts 22 whose top to bottom or height dimensions match those of the bar portions 16 and 18 along the line 38, the user can lengthen or shorten the cutting bar assembly 14 at will and with the same comparable effort as that required to replace a changeable nose portion which is commonly done as required when the need arises. While the peripheral edges 46 of the two extension members 22-1 and 22-2 including the saw chain track 32 are shown being substantially straight in FIGS. 3 and 4, when desired, they may include a convex contour to substantially match the contour of the outer guide bar portions 16 and 18. It should also be pointed out that the guide bar assembly 14 of the present invention permits either one of three guide bar components 16, 18, or 22 to be individually replaced exclusive of the others, thereby providing an economic benefit which has heretofore been unavailable.

Figure 7:
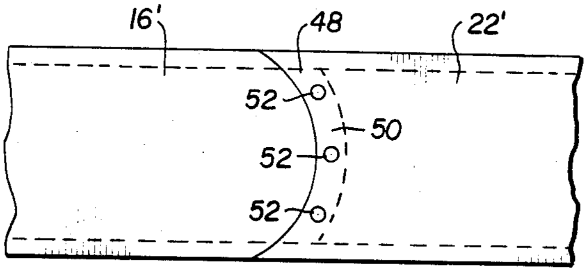
FIG. 7 is a first modification of the means for joining a guide bar extension member to a guide bar in accordance with the subject invention.
Figure 8:
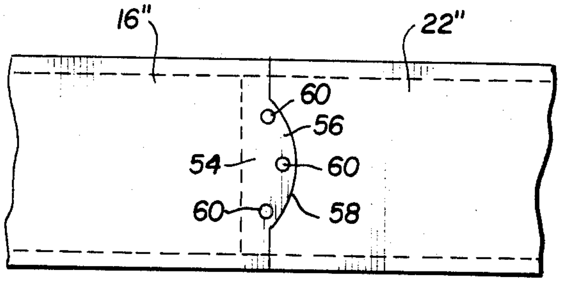
FIG. 8 is a second modification of means for joining a guide bar extension member to a guide bar in accordance with the subject invention.
Figure 9:
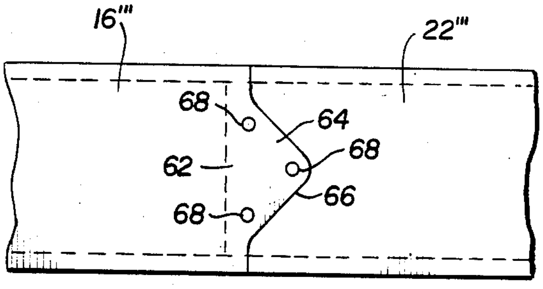
FIG. 9 is a third modification of means for joining a guide bar extension member to a guide bar in accordance with the subject invention.

Referring now to FIGS. 7, 8 and 9, shown thereat are three possible variations of the interconnection between the two guide bar portions 16 and 18 or between the bar extension member 22 and either of the outer guide bar portions 16 or 18. FIG. 7, for example, is intended to show the interconnection between a bar extension member 22' with a rear guide bar portion 16' and wherein a concave bifurcated end segment 48 of member 22' mates with a convex recessed end portion 50 of the guide bar portion 16'. Interconnection again is made by a set of three rivets, not shown, placed through holes 52. With respect to the configuration of FIG. 8, there is shown a squared end segment 54 of reduced thickness of a bar extension member 22'' which is adapted to interfit with a bifurcated end segment 56 of a rear guide bar portion 16''. The end segment 56, moreover, includes a rounded section 58 to accommodate three rivet holes 60. The configuration of FIG. 9 is similar to that in FIG. 8 in that an extension member 22''' includes a squared off end segment 62 of reduced thickness which engages a bifurcated end segment 64 of a rear guide bar portion 16'''. The main difference between the configurations of FIGS. 8 and 9 is that the bifurcated end segment 64 includes a generally triangular section 66 for accommodating the rivet holes 68.

Figure 10:
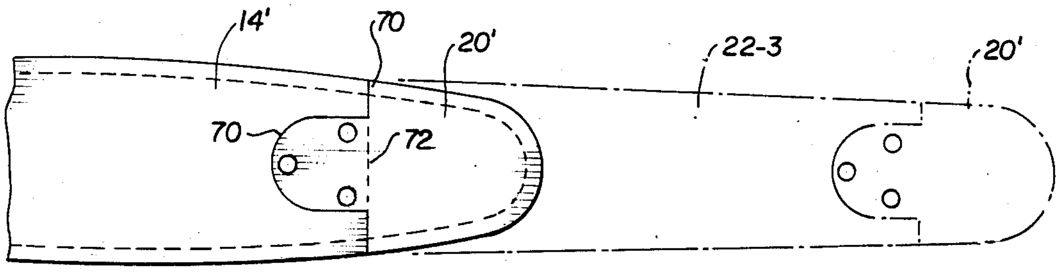
FIG. 10 is a partial top planar view of another embodiment of the invention.

Turning attention now to FIG. 10, shown thereat is a partial section of a guide bar 14' which is configured to include a changeable nose portion 20' and which is shown having the same arrangement for interconnection as shown in FIG. 2 in that the changeable nose portion 20' includes a bifurcated rounded end segment 70 which is adapted to fit over a reduced end segment 72 which has the same shape as segment 70. Whereas the prior art discloses the replacement of the changeable nose portion 20' with a like part, the present invention further contemplates the insertion of guide bar lengthening means at the nose end of the guide bar 14 and which comprises either a replaceable nose portion of extra length, not shown, or a bar extension member 22-3 as shown in phantom between a conventional replaceable nose portion 20' and the outer end segment 70 of the bar 14.

Accordingly, what has been shown and described is an improvement in guide bars for a chain saw which permits the user to lengthen or shorten the guide bar on demand as the need requires without resorting to a complete replacement of the bar and thus providing a considerable reduction in operating costs of a chain saw.

Having shown and described what is at present considered to be the preferred embodiment of the subject invention, it should be noted that the same has been made by way of illustration and not limitation. Accordingly, all modifications, alterations and changes coming within the spirit and scope of the invention as set forth in the appended claims are herein meant to be included.

I claim:

1. In a chain saw including a cutting chain adapted to travel around a guide bar and being coupled to and driven by a drive unit, the combination comprising:
   - an elongated multiple section guide bar whose periphery is convexly curved, at least in part, and comprised of rear and forward coplanar guide bar portions each having a peripheral cutting chain track, with the rear end of said rear portion being attachable to the drive unit; and
   - a coplanar guide bar extension member of predetermined length located intermediate said rear and forward guide bar portion for varying the working length of said guide bar, said extension member having matching height dimensions with the rear and forward guide bar portions at the points of junction therewith and having upper and lower peripheral cutting chain tracks joining the tracks of said rear and forward guide bar portion to provide a coextensively continuous cutting chain track.

2. A guide bar in accordance with claim 1 wherein said bar extension member is located substantially midway along the guide bar assembly.

3. A guide bar in accordance with claim 1 wherein said extension member is inserted substantially at the apex of said convexly curved periphery.

4. A guide bar in accordance with claim 1 wherein said bar extension member comprises a member having a length variable from between substantially 2 inches and 20 inches.

5. A guide bar in accordance with claim 1 wherein said rear guide bar portion and said forward guide bar portion include mutually facing end segments of a respective first type and a second type which are adapted to interfit and connect to each other, and wherein said bar extension member includes a said second type segment at one end thereof for connection to said first type segment of said rear guide bar portion and a said first type segment at the other end thereof for connection to said second type segment of said forward guide bar portion.

6. A guide bar in accordance with claim 5 wherein said end segments of first and second type comprise complementary end segments.

7. A guide bar in accordance with claim 5 wherein said end segments of first and second type selectively comprise male and female type connections.

8. A guide bar in accordance with claim 5 wherein said end segments of first and second type selectively comprise a bifurcated connecting member and a unitary connecting member of reduced thickness engageable with said bifurcated member.

9. A guide bar in accordance with claim 5 and additionally including a set of rivets for fastening said bar extension member between said rear and forward outer guide bar portions at the location of said end segments.

10. A guide bar in accordance with claim 1 wherein said forward guide bar portion comprises a detachable nose portion.

11. In a chain saw including a cutting chain adapted to travel around a guide bar and being coupled to and driven by a drive unit, the combination comprising:

an elongated planar chain saw guide bar having a convexly curved body portion including a rear and forward end and having an upper and lower peripheral cutting chain track, with the rear end thereof being attachable to the drive unit;

a coplanar detachable convexly curved nose portion at the forward end of said body portion and also having a peripheral cutting chain track including upper and lower cutting chain tracks connectable to the upper and lower cutting chain tracks of the body portion; and a coplanar chain saw guide bar extension member inserted between said detachable nose portion and said forward end of said body portion for varying the working length of said guide bar, said extension member having matching height dimensions with the body portion and the nose portion at the points of juncture therewith and having upper and lower peripheral cutting chain tracks joining the tracks of said body portion and nose portion to provide a coextensively continuous cutting chain track.

* * * * *